(12) United States Patent
Szczukowski et al.

(10) Patent No.: US 6,676,345 B2
(45) Date of Patent: Jan. 13, 2004

(54) SYSTEM FOR ATTACHING A STRUCTURAL MEMBER TO A SUPPORTING MEMBER

(75) Inventors: Adi Szczukowski, Menden (DE); Stefan Lafeld, Menden (DE); Thomas Bieber, Dortmund (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 10/092,590

(22) Filed: Mar. 8, 2002

(65) Prior Publication Data

US 2002/0131840 A1 Sep. 19, 2002

(30) Foreign Application Priority Data

Mar. 15, 2001 (DE) .......................... 101 13 044

(51) Int. Cl.$^7$ ..................... F16B 31/02; F16B 43/00
(52) U.S. Cl. ................................. 411/9; 411/533
(58) Field of Search ................. 411/360, 369, 411/353, 999, 432, 533, 542, 546, 182, 9

(56) References Cited

U.S. PATENT DOCUMENTS

| | | | | |
|---|---|---|---|---|
| 1,607,274 A | * | 11/1926 | Hecht | 411/432 |
| 2,915,152 A | * | 12/1959 | Graham | 403/288 |
| 3,386,771 A | * | 6/1968 | Verdier et al. | 301/35.625 |
| 3,431,811 A | * | 3/1969 | Yonkers | 411/432 |
| 3,534,651 A | * | 10/1970 | Belfiglio | 411/9 |
| 4,016,914 A | | 4/1977 | Zurko | |
| 4,850,771 A | * | 7/1989 | Hurd | 411/43 |
| 4,969,788 A | * | 11/1990 | Goiny | 411/428 |
| 4,975,008 A | * | 12/1990 | Wagner | 411/337 |
| 5,139,361 A | * | 8/1992 | Camuffo | 403/408.1 |
| 5,711,711 A | | 1/1998 | Schmidt, Jr. | |
| 6,030,161 A | * | 2/2000 | Udell et al. | 411/353 |
| 6,227,784 B1 | * | 5/2001 | Antoine et al. | 411/369 |

FOREIGN PATENT DOCUMENTS

| | | |
|---|---|---|
| EP | 0 942 164 | 9/1999 |
| WO | WO 87/05976 | 10/1987 |

\* cited by examiner

*Primary Examiner*—Flemming Saether
*Assistant Examiner*—Jori Schiffman
(74) *Attorney, Agent, or Firm*—Lowe Hauptman Gilman & Berner LLP

(57) ABSTRACT

A system for attaching a structural member to a supporting member, the supporting member having at least one stud which extends through an opening of the structural member, the system comprising a sleeve having as radial flange at one end adapted to be introduced into the opening, an annular sealing element positioned on the sleeve and adapted to engage the associated surface of the structural member, an integral nut arrangement, preferably of spring steel, which has a nut portion adapted to be threaded onto the stud, a fastening portion adapted to be secured to the flange, the fastening portion being rotatable with the flange and engages axially the radial flange of the sleeve, and a deformable portion between the nut portion and fastening portion which allows a certain axial deformation if the nut arrangement is threaded onto the stud with a predetermined torque into engagement with the radial flange, the deformable portion and the fastening portion forming a passage for the stud.

17 Claims, 3 Drawing Sheets

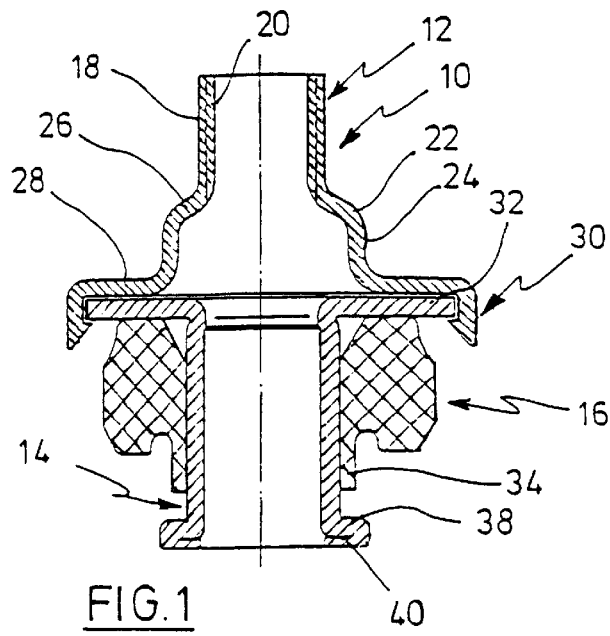
FIG. 1
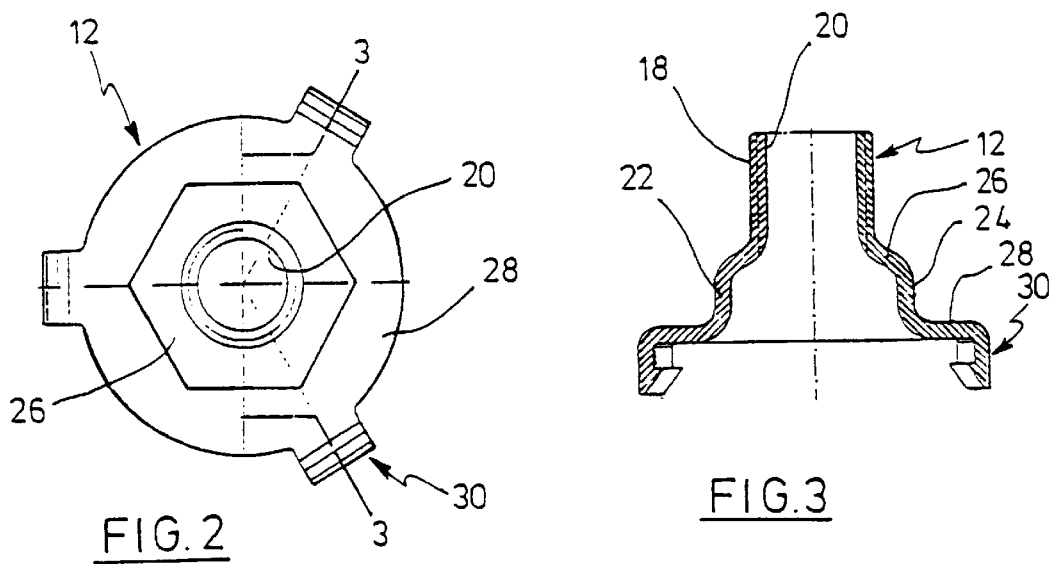
FIG. 2
FIG. 3
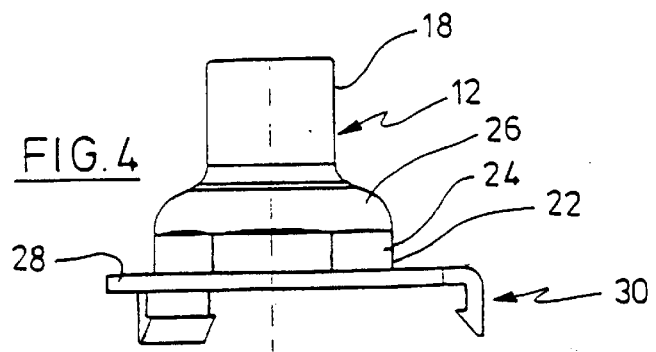
FIG. 4

SYSTEM FOR ATTACHING A STRUCTURAL MEMBER TO A SUPPORTING MEMBER

The invention relates to a system for attaching a structural member to a supporting member.

There is frequently an object to safely attach a structural member to a supporting member and to arrange for the structural member not to come off by itself because of a permanent vibration of the supporting member. In addition, there is an object to mount the structural member on the supporting member in a sealed and vibration-cushioned way. Such a case exists, for example, when a hood is attached which requires to be fixed to the engine block as a cover of the cylinder head. A similar attachment case also exists when intake pipe systems are mounted. The supporting member mostly has mounted thereon so-called studs to which the structural member is then attached by means of a nut. However, a common nut when being tightened only has a small angle of rotation of 360°, for example, to apply the torque required. The risk is that the nut will loosen after some time. In such a "severe" thread-on case, merely a slight distortion of the nut already causes it to be loosened, which is undesirable. The nut might also be loosened by the fact that the entire assembly undergoes permanent deformation, which is also called a setting deformation, because of the tension and compression forces which are applied. A slight stress relief already causes the bias to be eliminated.

It is the object of the invention to provide a system for attaching a structural member to a supporting member wherein the attached assembly is prevented from getting independently loosened despite the setting deformation phenomena.

The object is attained by the features of the instant invention.

The inventive system consists of three components, i.e. a sleeve, a nut arrangement, and an annular sealing element. However, it should be noted that the annular sealing element, which is preferably made of an elastomeric material, may be omitted if neither a sealing effect nor any cushioning of vibrations is desired.

The sleeve has a radial flange and has an inner diameter which is slightly larger than the outer diameter of the stud. The nut arrangement has a nut portion which is adapted to be threaded onto the stud. It further has a fastening portion which is adapted to be captivated to the flange of the sleeve, in which case, however, a relative rotation is possible between the sleeve and the nut arrangement. An elastically deformable portion is provided between the nut portion and the fastening portion, which yields if the nut arrangement, while being axially pressed against the sleeve, is threaded onto the stud. At this stage, the fastening portion of the nut arrangement will come into engagement with the radial flange of the sleeve which, in turn, is supported on the supporting member or on an abutment surface of the stud of the supporting member. At the same time, the structural member to be attached is pressed against the supporting member via the radial flange of the sleeve.

The nut arrangement is made of steel, preferably spring steel, which is rather strong although it makes possible a certain axial deformation in the deformable portion. In this way, a rotation through 360° may take place twice or three times while the nut portion is tightened. This causes a bias to be built up via a relatively large path, which will not get lost either even if the nut arrangement loosens by a certain angle of rotation, for example, or setting deformation phenomena are encountered.

The nut arrangement is of a large hardness which is achieved in a multi-stage quench-and-temper procedure. Such a procedure is known as such. The aim is to achieve a hardness of from 45 to 50 HRC (Rockwell hardness) for the inventive nut arrangement.

According to an aspect of the invention, the outer side of the nut arrangement has formed thereon wrench surfaces, preferably in the shape of a hexagon. The wrench surfaces are preferably located in a portion larger in diameter between the nut portion and the fastening portion. As a result, the nut arrangement allows to use wrenches of larger dimensions, which makes it easier to apply a high torque.

In another aspect of the invention, a provision is made for the nut arrangement to have the shape of a stepped sleeve with the exception of the fastening portion, with the nut portion having a first outer diameter and the joining portion having a second outer diameter and the rounded step between the portions forming the deformable portion. The step or shoulder is of a slightly conical shape with appropriately rounded transition zones being provided towards the fastening portion and nut portion so as to avoid inadmissible stresses on the material during deformation.

According to another aspect of the invention, the fastening portion has a flange which engages the flange of the sleeve, and at least two hook-shaped gripping portions are formed to the circumference of the radial flange which engage the edge of the sleeve flange. It is imaginable to produce the captive, but rotatable connection between the nut arrangement and the sleeve in another way, particularly if sufficient space is available. Forming hook-shaped gripping portions saves exceptionally much space and is completely sufficient to provide the captive nature. Particular forces need not be transmitted in this region. Preferably, three gripping portions are provided which are offset by 120° from each other.

In another aspect of the invention, the other end of the sleeve also has formed thereto a radial flange which preferably extends outwardly. It will then bear against the supporting member or a bearing contact surface of the stud. In this manner, the sleeve acts as a spacer and prevents the sealing element from being subjected to too large a compression. Furthermore, the rotatability between the nut arrangement and the sleeve prevents the sealing element from undergoing a torsion while the nut arrangement is tightened.

As was previously mentioned the sleeve can be supported on an abutment surface of the stud. The abutment surface may be formed by an enlarged portion of the stud which has wrench surfaces at its circumference. For example, the stud is screwed into appropriate threaded bores in engine blocks. The wrench surfaces may then be used to apply an appropriate torque with a view to efficiently attaching the stud to the engine block.

The invention will now be explained in more detail with reference to the drawings.

FIG. 1 shows a fastening system according to the invention in a section.

FIG. 2 shows the nut arrangement of the fastening system of FIG. 1 in a bottom view.

FIG. 3 shows a section through the nut arrangement of FIG. 2 along lines 3—3.

FIG. 4 shows a side view of the nut arrangement of FIG. 2.

Figure 5:
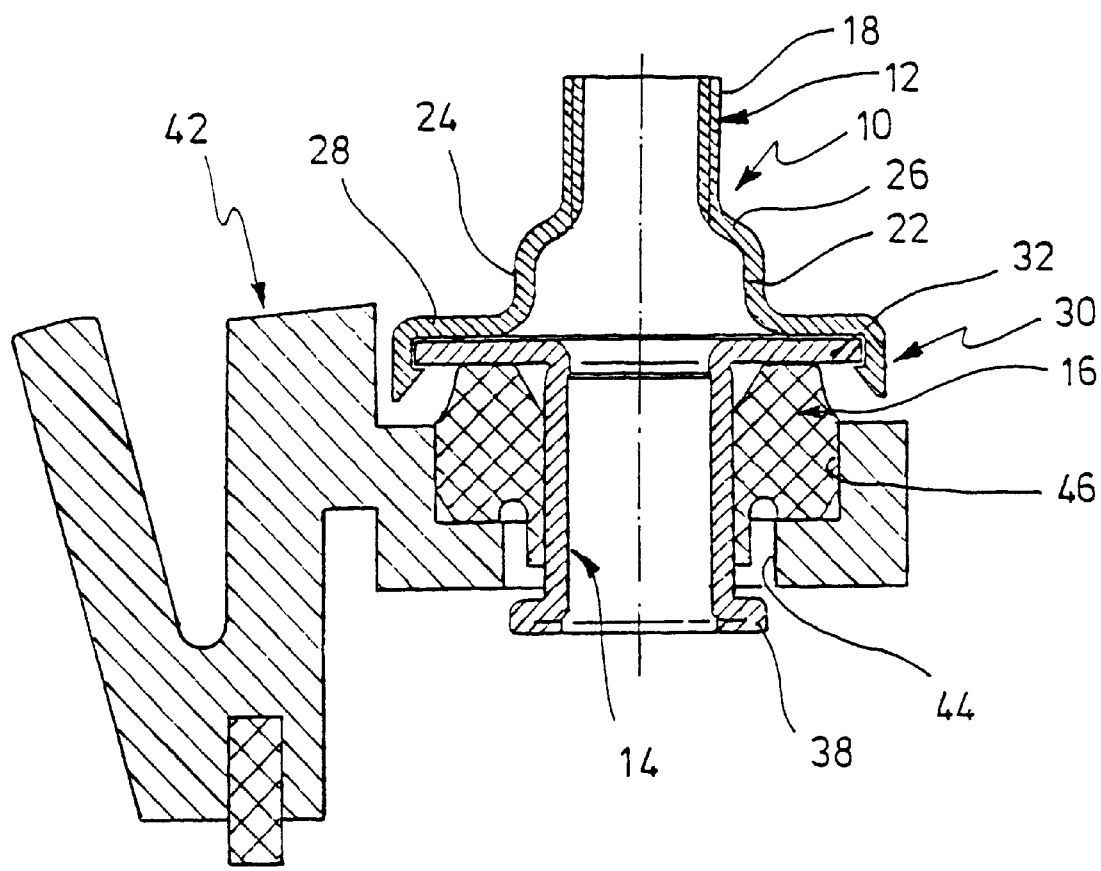
FIG. 5 shows how to assemble the fastening system of FIG. 1 in the hood of a cylinder head.

The fastening system illustrated in FIG. 1 is generally designated by 10. It comprises a nut arrangement 12, a sleeve 14, and a sealing element 16. The nut arrangement can be seen more distinctly from FIGS. 2 to 4.

The nut arrangement 12 has an annular cylindrical nut portion 18 which has a female thread 20. It further has a portion 22 which is hexagonal both at its inside and outside and by which wrench surfaces 24 are formed. The radial extension of the portion 22 is larger than that of the nut portion 18. Between those portions, a conically shaped, deformable portion 26 is located which is joined to the nut portion 18 and the portion 22 via a rounded transition zone. Portion 22 is joined to a radial flange 28. The circumference of the radial flange 28 has disposed thereon three gripping portions 30 which are formed like hooks in section as shown in FIGS. 1, 3, and 4. FIG. 4 does not show one of the three referenced gripping portion for reasons of illustration.

As can be appreciated from FIG. 1 the sleeve 14 has a radial flange 32. It is gripped around by the gripping portions 30 at its border so that nut arrangement 12 and sleeve 14 are captively connected to each other. A relative rotation is possible between these parts notwithstanding this. To connect these two parts, the gripping portions 30 are initially formed in such a way that the radial flange 32 may be readily placed against the radial flange 28 of the nut arrangement. The gripping portions are bent subsequently until they grip around the border of the radial flange 32 as can be seen from FIG. 1.

The sealing element 16 made of an elastomeric material is generally annular and engages its one front-end face with the underside of the radial flange 32 as can be seen from FIG. 1. The inside wall of the annular sealing element 16, while under a compression, bears against the outer side of the sleeve 14. An axial annular portion 34 of the sealing element 16 extends downwardly while engaging the outer side of the sleeve 14. Its outer diameter is relatively small. Sleeve 14, at its other end, has a radial flange 38 which has an upset portion as can be seen at 40.

Figure 6:
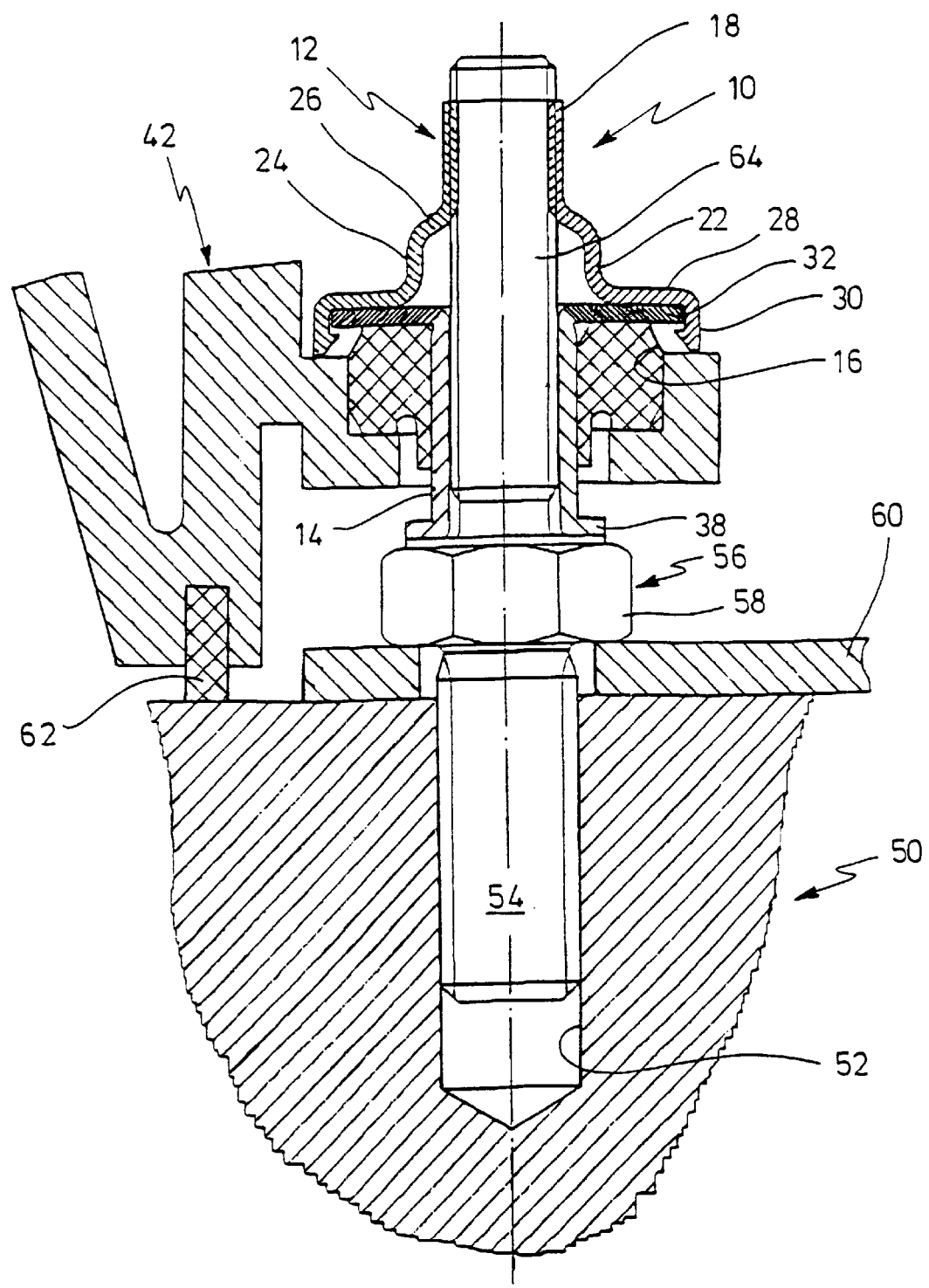
FIG. 6 shows how to mount the hood of the cylinder head of FIG. 5 on an engine block.

Referring to FIG. 5, a portion 42 of a hood is outlined which covers the cylinder heads of an engine. Hood 42 has a stepped bore with a first bore portion 44 and a second bore portion 46 which is of a larger diameter. The sealing element 16, while under a slight compression, is seated in the first bore portion 46 with the sleeve 14 with the flange 38 extending downwardly through the second bore portion 44. Hood 42 and fastening portion 10 constitute a pre-assembled unit which can be connected to an engine block 50 as can be seen from FIG. 6. The engine block 50 is shown only in its outlines and has a threaded bore 52 which accommodates a threaded shank of a stud 54. Stud 54 possesses a radially enlarged portion 56 which has wrench surfaces 58 in the shape of a hexagon. A panel-shaped structural member 60 is arranged between the enlarged portion 58 and the surface of the engine block 50 facing it. The hood 42 has countersunk therein a circumferential seal 62 which is in engagement with the surface of the engine block 50 facing it. The upper threaded portion 64 of the stud 54 extends through the sleeve 14 and the nut arrangement 12 is threaded onto the shank portion 64. To finally attach the hood 42, the nut arrangement 12 is tightened on the shank portion 64. This causes the nut arrangement 12 to rotate with respect to the sleeve 14 and the sealing element 16 which remains stationary on the hood 42. The arrangement will have been tightened after two or three rotations. At this stage, the radial flange portion 28 of the nut arrangement 12 is supported on the radial flange 32 of the sleeve 14 and the radial flange 38 of the sleeve 14, in turn, is supported on the side of the radial enlargement 56 of the stud 54 which faces it. Hence, sleeve 14 serves for limiting the compression of the sealing element 16. The sealing element, in turn, is not stressed by torsion because only the nut arrangement 12 is rotated as was mentioned previously. When the tensile force is applied to the stud 54 the portion 26 experiences a certain deformation so that the nut arrangement 12 may effect two, three or more rotations before the tensile force desired or the torque required is reached. The gripping portions maintain a sufficient distance from the hood 42.

What is claimed is:

1. An integral nut assembly comprising:
    an internally female threaded, first hollow cylindrical section having an internal diameter;
    wherein said female threading is adapted to engage male threads of a stud;
    a deformable, generally frusto-conical, second hollow section, integral with said first hollow section, axially extending from one end of said first hollow section and having a set of internal diameters that are larger than the internal diameter of said first hollow section and extend from said first hollow section;
    a third hollow section, integral with said second hollow section, axially extending from the distal end of said second hollow section and having wrench surfaces at least as a portion of an outside surface thereof; wherein said third hollow section has internal diameter(s) that are not smaller than the internal diameter of said first hollow section;
    a flange section, integral with said third hollow section, having a centrally disposed aperture that has a diameter that is not smaller than the internal diameter of said first hollow section and extends outwardly from the distal end of said third hollow section; and
    a plurality of gripping means disposed at the periphery of said flange section, and adapted to grip a second flange that is not integral with said nut assembly;
    wherein turning of said nut assembly by applying torque to said wrench surfaces is adapted to cause said female threads to engage with and proceed along said male stud threads and is adapted to deform said second hollow section whereby forcing said flanges together.

2. A system for attaching a structural member (42) to a supporting member (50), the supporting member (50) having at least one stud (54) which extends through an opening (44) of the structural member, the system comprising:
    a sleeve (14) having a radial flange (32) at one end adapted to be introduced into the opening in said structural member (42) and disposed about said stud (54);
    an annular sealing element (16) positioned on an outer surface of the sleeve (14) and adapted to engage an associated surface (46) of the structural member (42);
    an integral nut arrangement (12) as claimed in claim 1, which has a first hollow cylindrical section (18) adapted to be threaded onto the stud (54); and
    a fastening portion, comprising said integral nut flange (28) and gripping means (30) adapted to secure said integral nut flange 28 to the sleeve flange (32), wherein the fastening portion is rotatable with the flange (32).

3. The system of claim 2, wherein the outer side of the nut arrangement (12) has wrench surfaces (24).

4. The system of claim 2, wherein, with the exception of the fastening portion (28, 30), the nut arrangement (12) has the form of a stepped sleeve, with the nut portion (18) having a first outer diameter and a joining portion (22) having a second larger diameter, and the rounded step between the portions forming the deformable portion (26).

5. The system of claim 2, wherein the fastening portion has a radial flange (28) which engages flange (32) of sleeve (14), and at least two hook-shaped gripping portions (30) are formed at the circumference of the radial flange (28) which engage the edge of flange (32).

6. The system of claim 2, wherein a radial flange (38) is disposed at the other end of sleeve (14).

7. The system of claim 2, wherein the stud (54) has a radial abutment surface which is engaged by the other end of sleeve (14).

8. The system of claim 7, wherein the abutment surface is formed at a radial enlargement (56) of stud (54), the enlargement having wrench surfaces (58) at the circumference thereof.

9. The system of claim 2, wherein the nut arrangement (12) has a hardness of 45 to 50 HRC.

10. A system as claimed in claim 2 wherein said wrench surfaces are hexagonal.

11. A nut assembly as claimed in claim 1 made of spring steel.

12. A nut assembly as claimed in claim 1 further comprising an arcuate transition from said first hollow section to said second hollow section.

13. A nut assembly as claimed in claim 11 further comprising an arcuate transition from said second hollow section to said third hollow section.

14. A nut assembly as claimed in claim 11 further comprising an arcuate transition from said third hollow section to said flange section.

15. A nut assembly as claimed in claim 1 wherein said internal diameter of said second and third hollow sections and the diameter of the aperture of said flange are all larger than the internal diameter of said first hollow section.

16. An assembly as claimed in claim 15 further comprising a radially enlarged area of said stud disposed between said support member and said sleeve, and further comprising wrench engaging surfaces on an outside surface of said enlarged area.

17. An assembly of a structural member with a support member comprising:

a nut assembly as claimed in claim 1;

a sleeve assembly, comprising a tubular section terminating at one end in a flange abutting said nut assembly flange and held in such abutting relationship by being nested within said gripping means;

an annular, resilient sealing element disposed circumferentially about said tubular section and in axial contact with said sleeve flange;

a structural member disposed about said tubular section of said sleeve in circumferential contact with said sealing element;

a supporting member in substantial axial alignment with said nut assembly and said structural element; and a male threaded stud extending from said supporting member in axial alignment with said first hollow section and having its male threads engaged with said female threads.

* * * * *